US007106340B2

(12) United States Patent
Moeser

(10) Patent No.: US 7,106,340 B2
(45) Date of Patent: Sep. 12, 2006

(54) METHOD FOR CONTROLLING THE ACCESS TO A STORAGE DEVICE AND A CORRESPONDING COMPUTER PROGRAM

(75) Inventor: Paul-Christian Moeser, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 212 days.

(21) Appl. No.: 10/332,880

(22) PCT Filed: Jul. 6, 2001

(86) PCT No.: PCT/DE01/02523

§ 371 (c)(1),
(2), (4) Date: Jul. 1, 2003

(87) PCT Pub. No.: WO02/05094

PCT Pub. Date: Jan. 17, 2002

(65) Prior Publication Data

US 2004/0044695 A1 Mar. 4, 2004

(30) Foreign Application Priority Data

Jul. 11, 2000 (DE) ................................ 100 33 612

(51) Int. Cl.
*G06F 12/00* (2006.01)
*G06F 12/02* (2006.01)

(52) U.S. Cl. ...................... 345/564; 345/565; 345/566; 345/567

(58) Field of Classification Search ................ 345/530, 345/564, 501, 545, 565, 531, 566, 567; 711/100, 711/202, 170–173, 153; 707/200
See application file for complete search history.

(56) References Cited

U.S. PATENT DOCUMENTS 4,533,910 A * 8/1985 Sukonick et al. ........... 345/545
5,706,407 A * 1/1998 Nakamura et al. .......... 711/172
6,292,874 B1 * 9/2001 Barnett ....................... 711/153

* cited by examiner

*Primary Examiner*—Kee M. Tung
*Assistant Examiner*—Hau Nguyen
(74) *Attorney, Agent, or Firm*—Bell, Boyd & Lloyd LLC

(57) ABSTRACT

A method and computer program are provided for controlling access to a memory device wherein, even with a complex data storage structure, access is made to memory areas within the memory device with a minimal number of selection inputs required for selection of a desired memory area.

10 Claims, 4 Drawing Sheets

METHOD FOR CONTROLLING THE ACCESS TO A STORAGE DEVICE AND A CORRESPONDING COMPUTER PROGRAM

BACKGROUND OF THE INVENTION

The continuously increasing extent of the functionality of applications which are provided in data processing systems has resulted in the amount of data which needs to be controlled by the data processing systems increasing to a similar extent. The desire to use the extended functionality of applications (for example, for supporting complete business processes) is a further motivation for increasing networking of data processing systems and for increased integration of different applications provided there, in order to form workflow management systems. The increasing networking of data processing systems and the increased integration of applications have increasingly led to the need to take account of the problems associated with multiple access to memory devices in the data processing systems. Increasing amounts of data and multiple access not only result in new requirements for data maintenance and distribution, but also require new strategies for access to memory resources by data processing systems.

The present invention is, therefore, directed toward a method for fast and efficient control of access to a memory device, and a computer program for implementing the method.

SUMMARY OF THE INVENTION

Accordingly, in an embodiment of the present invention, a method is provided for controlling access to a memory device, wherein the method includes the steps of: visualizing text and/or graphics contents from a control file on a user interface; receiving a first selection input from a user; reading a first address value, which is associated with the first selection input, from the control file; transmitting the first address value to an address allocation device; addressing, on the basis of the first address value, a memory element in the memory unit which is associated with the address allocation device; visualizing text and/or graphics contents from the memory element, to which second address values are allocated, via which addressing information for the memory device or for a memory element is identified; receiving a second selection input which is made based on the visualized text and/or graphic contents of the memory element; selecting a second address value which is associated with the second selection input; and reading a memory area identified by the second address value in the memory element, or addressing a memory element based on the addressing information, which is identified by the second address value, for reading and evaluating further second address values.

In a further embodiment of the present invention, a computer program is provided which can be loaded into a main memory of the computer and which has at least one software code section, wherein the running of the computer program affects the above-described method for controlling access of a memory device.

One major aspect of the present invention is that, even with a complex data storage structure, access is made to memory areas within the memory device with a minimal number of selection inputs required for selection of a desired memory area. This is achieved by providing first address values from a control file and second address values from a memory element in a memory unit which is associated with an address allocation device, in the sense of information precompression. The first and the second address values are each associated with text and graphics contents in the control file and/or in a memory element, which are visualized on a user interface in order to assist the selection of the address values. Specific preparation for access to desired data in a selected memory area of the memory device takes place in the address allocation device by evaluating the second address values, which identify addressing information for the memory device or for a memory element.

A further aspect of the present invention is the provision of a substantially complete overview of a complex data storage structure with a fine breakdown.

Additional features and advantages of the present invention are described in, and will be apparent from, the following Detailed Description of the Invention and the Figures.

DETAILED DESCRIPTION OF THE INVENTION

Figure 1:
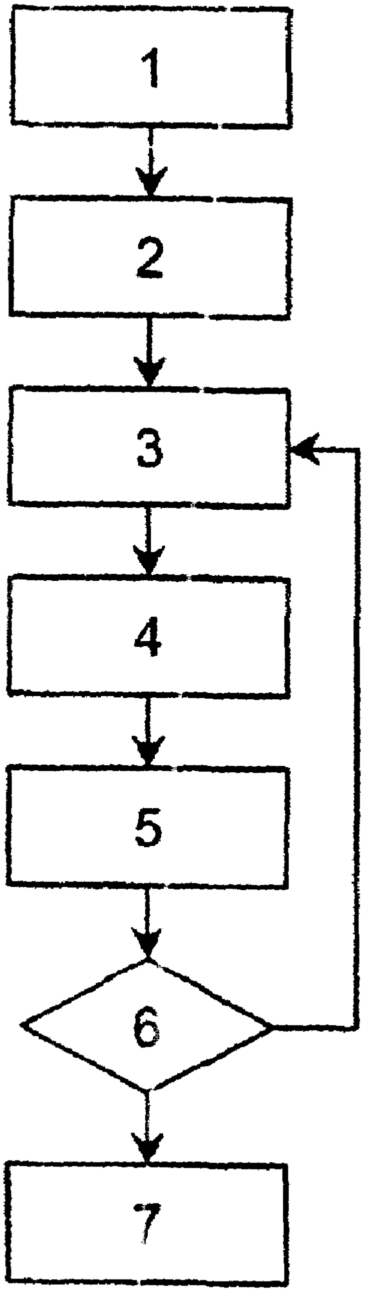
FIG. 1 shows a flowchart of the method according to the present invention.

The flowchart shown in FIG. 1 is used to illustrate the method of operation of the method according to the present invention for controlling access to a memory device DB. The method according to the present invention is preferably implemented by a computer program. The arrangement illustrated schematically in FIG. 2 relates to an example of devices which are involved in carrying out the method according to the present invention, and of the signal flow between these devices. Depending on the requirement, electronic, magnetic or optical storage media may be used, for example, for the storage device DB.

Figure 2:
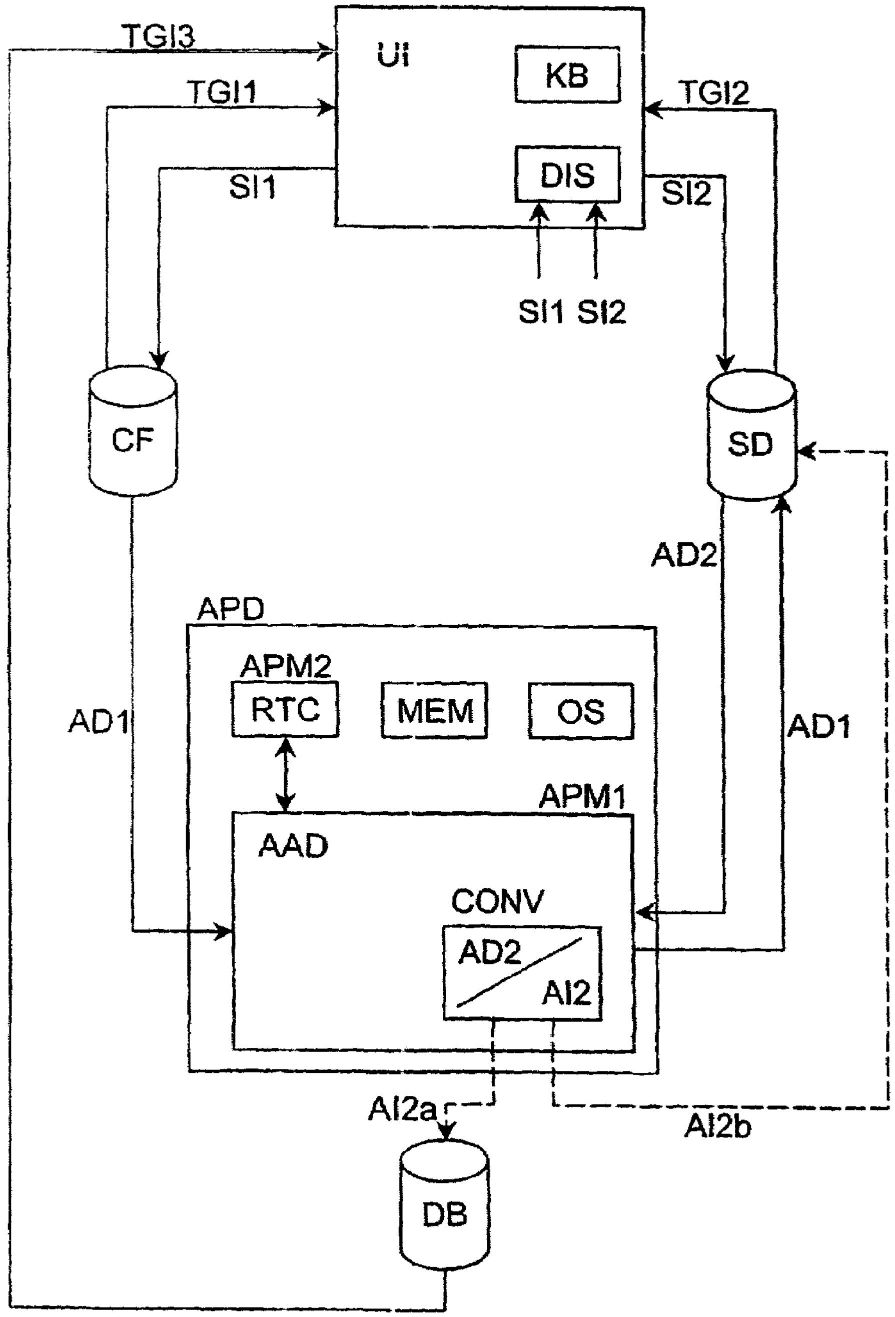
FIG. 2 shows a schematic illustration of an arrangement for carrying out the method according to the present invention.

In step 1 as shown in FIG. 1, text and graphics contents TGI1 from a control file CF are visualized on the user interface UI (see also FIG. 2). The user interface UI may, for example, be in the form of a personal computer or a workstation, and has a display device DIS and at least one input appliance KB; for example, a keyboard or a mouse. According to step 2 in the flowchart illustrated in FIG. 1, once a first selection input SI1, which is entered via the input appliance KB of the user interface UI, has been received from a user, a first address value AD1, which is associated with the first selection input SI1, is read from the control file (see also FIG. 2).

The first selection input SI1, may, for example, be linked to address information, or may contain this information. A memory area in the control file can be addressed on the basis of the address information, in order to read the first address value AD1 as the contents of this memory area. The text and graphics contents TGI1 from the control file CF as well as the first selection input SI1 can be transmitted between the user interface UI and the control file CF, such as via a data bus, which is not illustrated in any more detail in FIG. 2, between the user interface UI and a read/write apparatus for the control file CF.

The first address value AD1 is transmitted to an address allocation device AAD in a corresponding manner to step 3 in the flowchart. Furthermore, the first address value AD1 is used to address a memory element in a memory unit SD which is associated with the address allocation device AAD. Text and graphics contents TGI2 from the addressed memory element are then visualized (step 4).

The visualization likewise should be produced on the user interface UI. The text and graphics contents TGI2 from the addressed memory element are associated with second address values, which identify addressing information for the memory device DB or for a memory element of the memory unit SD. A converter CONV for the address allocation device AAD may be used, by way of example, to distinguish whether this addressing information relates to the memory device DB or to a memory element in the memory unit SD, and addresses either the memory device DB or the memory unit SD as a function of the addressing information.

According to step 5, once a second selection input SI2 has been received, a second address value AD2 is selected, which is associated with the second selection input SI2. The second address value AD2 is selected on the basis of the visualized text and graphics contents TGI2 of the addressed memory element. The second address value AD2 may, for example, be associated with the second selection input SI2 in a simple manner by the second selection input SI2 being transmitted as address information from the user interface UI via a data bus which is not illustrated in any more detail in FIG. 2, to the memory unit SD. The address information which is transmitted to the memory unit SD can be used to address a memory element for reading the second address value AD2. The second address value AD2 in this case represents the contents of this memory element. The text and graphics contents TGI2 which need to be visualized in order to select the second address value AD2 also may be transmitted via the data bus between the user interface UI and the memory unit SD. Once the second address value AD2 has been read, it is advantageously transmitted to the address allocation device AAD for further evaluation.

Since the second address value AD2 can identify addressing information AI2*a* for the memory device DB or addressing information AI2*b* for a memory element in the memory unit SD, a check is then carried out to determine whether this address information relates to the memory device DB or to a memory element in the memory unit SD (step 6).

This check may, for example, be carried out once again by the converter CONV for the address allocation device AAD, which addresses either the memory device DB or the memory unit SD as a function of the addressing information. If the addressing information relates to a memory element in the memory unit SD, then a jump is made back into step 3 within the flowchart that is illustrated in FIG. 1. As such, a memory element in the memory unit SD is addressed on the basis of the addressing information AI2*b*, which is identified by the second address value AD2 for reading and evaluating further second address values. The text and graphics contents TGI2 of the respectively addressed memory elements are advantageously visualized once again on the user interface UI for reading and evaluating further second address values.

If the addressing information identified by the selected second address value AD2 relates to the memory device DB, then, according to step 7 in the flowchart illustrated in FIG. 1, a memory area in the memory device DB is read on the basis of this addressing information AI2*a*. Text and graphics contents TGI3 which are stored in this memory area likewise are preferably transmitted to the user interface UI where they are visualized. As an alternative to this, it is also possible to transmit the memory area contents in the sense of file transfer, provided the user interface UI has its own memory device.

Once the second selection input SI2 has been received, the second address value AD2 is preferably selected via a sequence controller RTC or via the address allocation device AAD. The first address value AD1 is advantageously read by the sequence controller RTC once the first selection input SI1 of the user interface UI has been received. This also applies to the reading of the memory area which is identified by the second address value AD2 in the memory device DB. According to one preferred embodiment of the present invention, the address allocation device AAD and the sequence controller RTC are in the form of program modules APM1 and APM2, respectively, which run on an application device APD (see FIG. 2).

According to a further preferred embodiment of the method according to the present invention, once the data has been read from the memory area which is identified by the second address value AD2 in the memory device DB, an application is started which is associated with the read data by an operating system OS in the application device APD. A procedure such as this is possible not only in the situation where the functionality of the user interface UI is restricted to a display device DIS and an input appliance KB, but also in the situation where the user interface UI is in the form of a personal computer or a workstation in the sense of a client/server architecture. In both situations, it has been found to be advantageous to store the contents of the memory unit SD in a non-volatile form in the control file CF, to at least partially read the control file CF when starting access control to the memory device DB, and to write them to a main memory MEM for the application device APD. This implies that the control file CF and the memory unit SD are combined to form a common access control file.

Furthermore, the access control file and/or the control file CF and the memory unit SD as well as the memory device DB may not only be accommodated on a common data medium but also distributed over a number of data media. Furthermore, the memory element in the memory unit SD which is associated with the address allocation device AAD should, for signal-processing reasons, be addressed by the address allocation device AAD on the basis of the first address value AD1 read from the control file CF.

Figure 3:
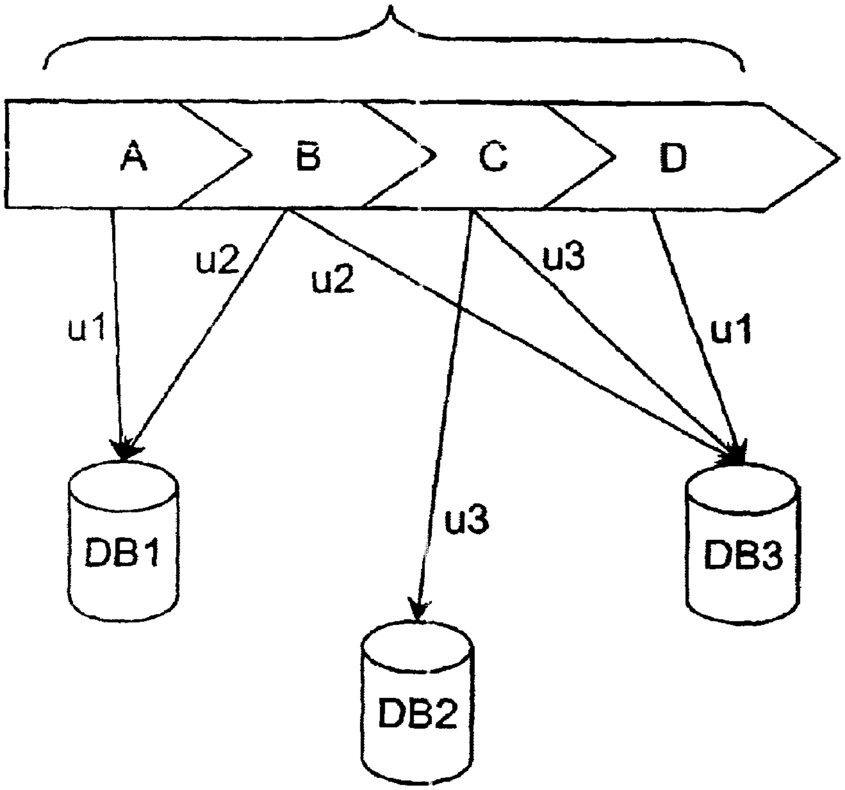
FIG. 3 shows an example of access to different memory devices during a main process.

FIG. 3 shows an example of access to different memory devices DB1, DB2, DB3 by a number of users u1, u2, u3 during a main process PRC. The main process PRC is, in turn, subdivided into a number of process elements A, B, C, D. The memory devices DB1, DB2, DB3 contain, for example, documents with information which is read, evaluated and possibly edited in the course of the main process PRC by the users u1, u2, u3 who are involved with this process. In the present example, one user u1, u2, u3 is, in each case, responsible for processing one process element A, B, C, D. In this case, it is actually not unusual for a user u1, as in the present example, to be responsible for processing two process elements A, D. A high level of matching and reprocessing effort is often necessary during the handling of main processes such as the main process PRC as a result of the overlaps, as can be seen in FIG. 3, between access by the users u1, u2, u3 to the memory devices DB1, DB2, DB3.

Figure 4:
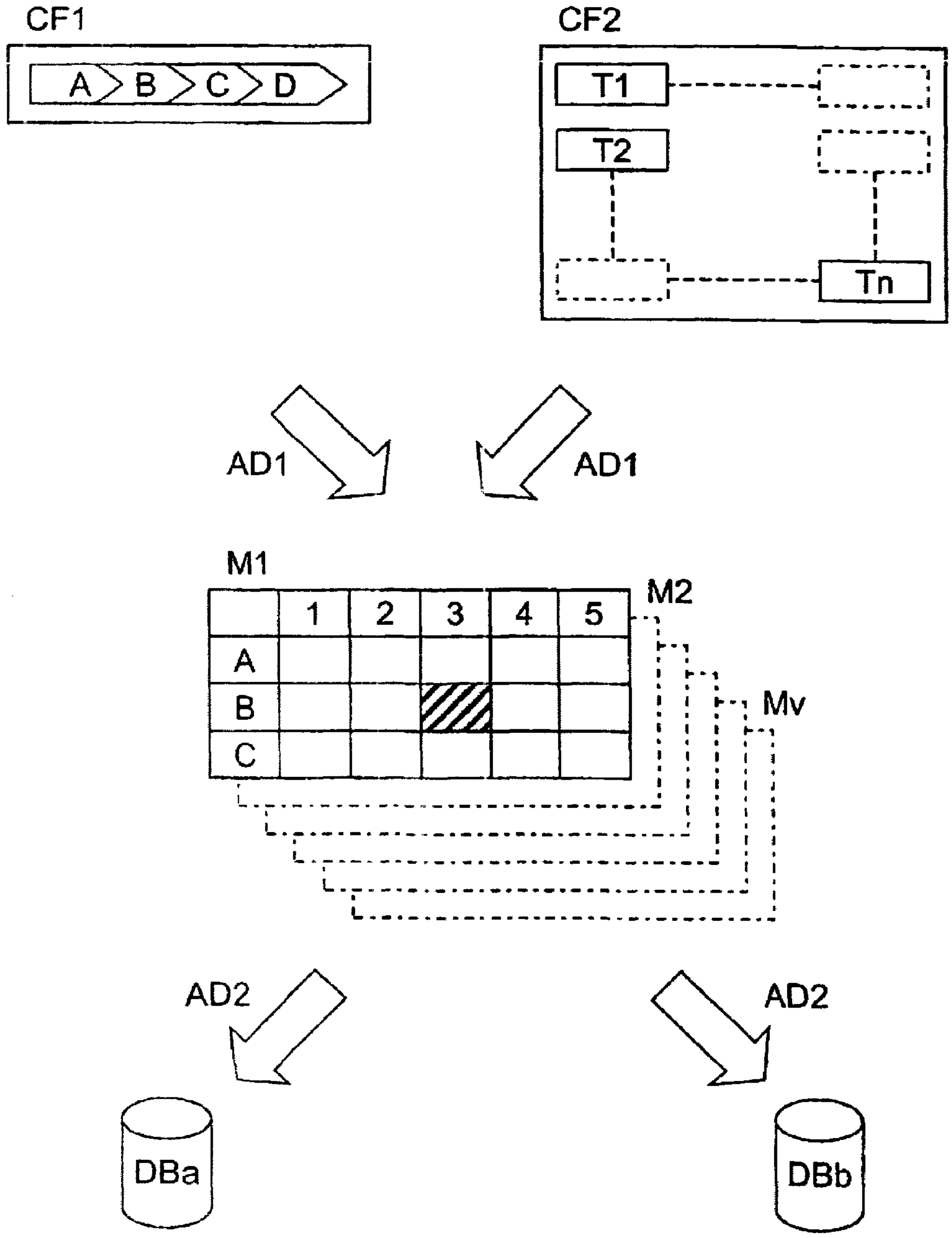
FIG. 4 shows a schematic illustration of a main process navigation system as an exemplary embodiment of the method according to the present invention.

A main process navigation system, which is illustrated schematically in FIG. 4 as an application example of the method according to the present invention, simplifies access to jointly used memory devices by a large number of users who are involved in one main process. In the example illustrated in FIG. 4, there are two control files CF1, CF2. The text and graphics contents may selectively be visualized either for one control file individually or for both control files jointly on one user interface UI as is illustrated in FIG. 2.

A first control file CF1 contains information relating to the running of a main process which is subdivided into a number of process elements A, B, C, D, in the same way as the main process PRC shown in FIG. 3. The information relating to the running of a main process also may be supplemented by details relating to tasks and responsibilities within individual process elements. A second control file contains information relating to individual task packets within a main process or within process elements, in the sense of activity lists. The two control files CF1, CF2 thus contain information relating to the provision of an overview of data which needs to be controlled by the main process navigation system. The use of two control files in this case allows an overview from two different perspectives. The number of control files may be increased further, depending on the requirement and structure of a database.

Once a first selection input has been received, a first address value AD1 is read from one of the two control files CF1, CF2 in an analogous manner to the above description relating to FIGS. 1 and 2. This address value AD1 is once again transmitted to an address allocation device, which is not shown in any more detail in FIG. 4. The transmitted address value is used for addressing a memory element in a memory unit which is associated with the address allocation device. According to the exemplary embodiment illustrated in FIG. 4, the memory elements are formed by matrices M1 to Mv. The matrices also contain text and graphics contents with reference to information which is relevant for a main process in the sense of convenient user control.

Once a second selection input has been received, which is based on the visualized text and graphics contents of the matrix M1, an associated second address value AD2 is selected for addressing the further matrices M2 to Mv or the memory devices Dba or DBb. The selection input that is made is illustrated graphically in FIG. 4 by a shaded area within the matrix M1.

Although the present invention has been described with reference to specific embodiments, those of skill in the art will recognize that changes may be made thereto without departing from the spirit and scope of the present invention as set forth in the hereafter appended claims.

The invention claimed is:

1. A method for controlling access to a memory device, the method comprising the steps of:

visualizing on a user interface at least one of text contents and graphics contents from a control file;

receiving a first selection input from a user;

reading from the control file a first address value which is associated with the first selection input;

transmitting the first address value to an address allocation device;

addressing, based on the first address value, a memory element in a memory unit which is associated with the address allocation device;

visualizing at least one of text contents and graphics contents from the memory element, to which second address values are allocated, via which addressing information for one of a memory device and a memory element is identified;

receiving a second selection input which is made based on the respective visualized text contents and the visualized graphics contents of the memory element;

selecting a second address value associated with the second selection input; and performing one of reading a memory area identified by the second address value in the memory device, and addressing a memory element based on the addressing information, which is identified by the second address value, for reading and evaluating further second address values.

2. A method for controlling access to a memory device as claimed in claim 1, wherein the step of selecting the second address value is performed via one of a sequence controller and the address allocation device.

3. A method for controlling access to a memory device as claimed in claim 2, wherein the step of reading the first address value from the controlled file is performed by the sequence controller.

4. A method for controlling access to a memory device as claimed in claim 2, wherein the step of reading the memory area identified by the second address value is performed by the sequence controller.

5. A method for controlling access to a memory device as claimed in claim 2, wherein at least one of the sequence controller and the address allocation device is a program module which runs on at least one application device.

6. A method for controlling access to a memory device as claimed in claim 5, the method further comprising the steps of:

reading data from the memory area identified by the second address value; and starting an application which is associated with the read data by an operating system in the application device.

7. A method for controlling access to a memory device as claimed in claim 5, the method further comprising the steps of:

storing contents of the memory unit in non-volatile form in the control file;

reading the contents of the memory unit, at least in part, from the control file; and writing the contents of the memory unit to a main memory of the application device when access control begins.

8. A method for controlling access to a memory device as claimed in claim 1, wherein the memory element is addressed by the address allocation device based on the first address value.

9. A method for controlling access to a memory device as claimed in claim 1, wherein the memory elements are formed by a memory matrix.

10. A computer program for loading into a main memory of a computer, the computer program including at least one software code section, the running of the computer program comprising:

a first step of visualizing at least one of text contents and graphics contents from a control file on a user interface;

a second step of receiving a first selection input from a user;

a third step of reading from the control file a first address value which is associated with the first selection input;

a fourth step of transmitting the first address value to an address allocation device;

a fifth step of addressing, based on the first address value, a memory element in a memory unit which is associated with the address allocation device;

a sixth step of visualizing at least one of text contents and graphics contents from the memory element, to which second address values are allocated, via which addressing information for one of a memory device and a memory element is identified;

a seventh step of receiving a second selection input which is made based on the respective visualized text contents and the visualized graphics contents of the memory element;

an eighth step of selecting a second address value associated with the second selection input; and a ninth step of performing one of reading a memory area identified by the second address value in the memory device, and addressing a memory element based on the addressing information, which is identified by the second address value, for reading and evaluating further second address values.

* * * * *